United States Patent [19]

Anderson et al.

[11] Patent Number: 4,492,881
[45] Date of Patent: Jan. 8, 1985

[54] STORED CHARGE INVERTER CIRCUIT

[75] Inventors: Thomas E. Anderson, Avon, Conn.; Alvin A. Bush; John Giorgis, both of South Euclid, Ohio

[73] Assignee: General Electric Company, Schenectady, N.Y.

[21] Appl. No.: 472,681

[22] Filed: Mar. 7, 1983

Related U.S. Application Data

[63] Continuation-in-part of Ser. No. 184,648, Sep. 5, 1980, abandoned.

[51] Int. Cl.³ ............... H03K 17/60; H03K 3/33; H02M 7/537
[52] U.S. Cl. .................. 307/270; 307/254; 307/300; 363/131
[58] Field of Search ............... 307/300, 289, 270, 254; 363/16, 17, 96, 131, 132

[56] References Cited

U.S. PATENT DOCUMENTS

| 2,971,166 | 2/1961 | Shultz | 331/113 |
| 3,144,563 | 8/1964 | Cohler et al. | 307/300 |
| 3,331,987 | 7/1967 | Powell | 315/206 |
| 3,482,145 | 12/1969 | Powell | 315/206 |
| 4,051,426 | 9/1977 | Wood | 363/131 |
| 4,242,605 | 12/1980 | Seelbach | 307/300 |

*Primary Examiner*—Stanley D. Miller
*Assistant Examiner*—B. P. Davis
*Attorney, Agent, or Firm*—Philip L. Schlamp; Fred Jacob

[57] ABSTRACT

An inverter circuit having a pair of transistors connected to alternately and repetitively apply electrical energy to an inductive load. Short duration turn-off pulses are alternately applied to the transistors, and means are connected so that when each transistor is turned off, fly-back current induced in the load is applied to the other transistor to create a stored charge for turning it on and keeping it on until it receives its next turn-off pulse. Thus, no externally supplied repetitive forward base current is required.

14 Claims, 2 Drawing Figures

STORED CHARGE INVERTER CIRCUIT

This is a continuation-in-part of patent application Ser. No. 184,648, filed Sept. 5, 1980, abandoned.

BACKGROUND OF THE INVENTION

The invention is in the field of inverter circuits employing transistors as switches for producing a-c output energy from d-c input energy.

A widely used type of inverter circuit has a pair of transistors, the emitter of one of the transistors and the collector of the other transistor being connected together to form a junction point, the remaining emitter and collector being respectively connected to terminals of a d-c electrical power source. A load (such as a lamp, motor, induction heater or other suitable device) is connected between the aforesaid junction point and the power source. The transistors are alternately driven to full conduction at a repetitive frequency rate of about 1 kHz or higher, by means of drive currents alternately applied to their base electrodes, thus passing an alternating current through the load from the power source. The aforesaid drive currents may be square waves or sine waves, of sufficient amplitude to drive the transistors quickly to full conduction whereby they add substantially no resistance in the power current path and thus do not consume and dissipate any appreciable electrical power.

U.S. Pat. No. 4,051,426 to Wood discloses an inverter circuit of the type just described, and also discloses an undesirable "stored charge" characteristic of transistors which can cause both of the inverter transistors to be conductive at the same time and produce an undesirable short circuit across the power source, known as "shoot-through." The patent also teaches a way of connecting diodes in the circuit to alleviate the problem.

SUMMARY OF THE INVENTION

Objects of the invention are to provide an improved inverter circuit, and to provide an inverter circuit that makes constructive use of the stored charge characteristic of transistors.

The invention comprises, briefly and in a preferred embodiment, an inverter circuit having a pair of transistors connected to alternately and repetitively apply electrical energy to an inductive load or a load having an inductive component. The emitter of one of the transistors and the collector of the other transistor are connected together to form a junction point, the remaining emitter and collector being respectively connected to terminals of a d-c electrical power source. A load which is inductive or which has an inductive component is connected between the junction point and the power source. Short duration turn-off pulses are alternately applied to the base electrodes of the transistors, and means such as diodes are connected so that when each transistor is turned off, fly-back current induced in the load is applied to the other transistor to create a stored charge for turning it on and keeping it on until it receives its next turn-off pulse. Thus, no externally supplied repetitive forward base current pulses are required; however, a single forward base current pulse is used to initiate operation of the circuit. Preferably, the repetitive frequency of the turn-off pulses applied to each transistor is sufficiently great so that the stored charges in each transistor do not drain off and become ineffective before the next turn-off pulse occurs; in other words, the turn-off pulse repetitive frequency is high enough so that terminations of the transistor's conductive periods is determined by the turn-off pulses and not by drain-off of the stored charges. In an alternative embodiment, the turn-off pulses are not employed, and the frequency of inverter operation is determined by the drain-off times of the stored charges.

DESCRIPTION OF THE PREFERRED EMBODIMENTS

Figure 1:
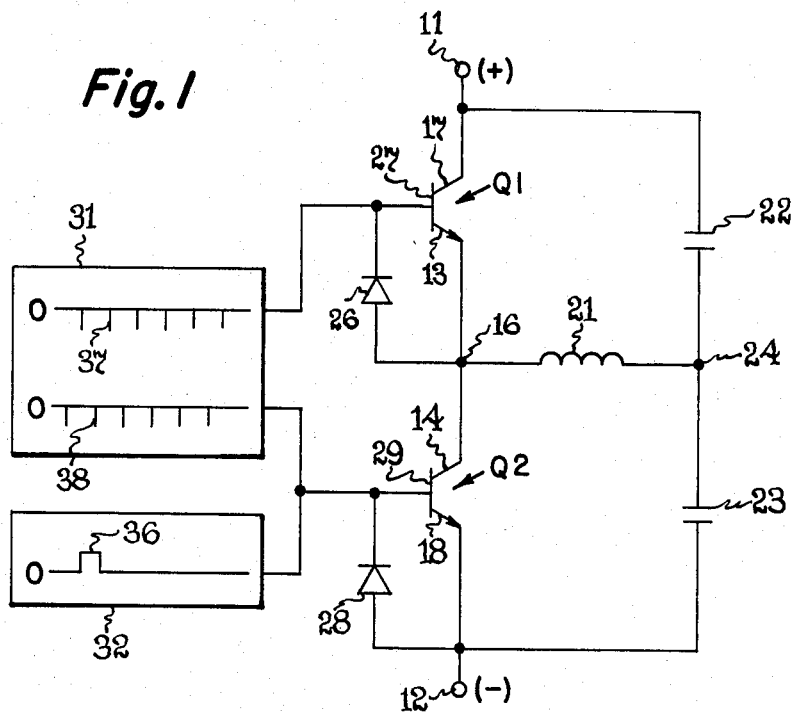
FIG. 1 is a schematic diagram of a preferred embodiment of the invention.

A pair of transistors Q1 and Q2 are connected between terminals 11 and 12 of a d-c electrical power source which may be a full-wave bridge rectifier providing about 200 volts d-c from a 120 volt a-c input. As indicated in the drawing, terminal 11 is positive polarity and terminal 12 is negative polarity. The emitter 13 of transistor Q1 and the collector 14 of transistor Q2 are connected together to form a junction point 16; the collector 17 of transistor Q1 is connected to the positive power terminal 11 and the emitter 18 of transistor Q2 is connected to the negative power terminal 12. A load 21, which is inductive or has an inductive component, such as a gas discharge lamp, motor, inductive heating unit, etc., is connected between the junction point 16 and the power source, the latter connection being provided by a pair of capacitors 22, 23 connected in series between the power terminals 11 and 12, the load 21 being connected to the junction 24 of the capacitors 22, 23. The capacitance valves of the capacitors 22, 23 preferably are equal and sufficiently large to provide a low impedance at the operating frequency of the circuit (such as 1 kHz or higher). Thus, the load 21 is in effect connected between the transistor junction point 16 and a center-tap of the power source. The load 21 may include a coupling transformer.

A diode 26 is connected between the base 27 and emitter 13 of transistor Q1, in a manner to pass positive-polarity current to the base 27. Another diode 28 is connected between the base 29 and emitter 18 of transistor Q2, in a manner to pass negative-polarity current from the base 29. A source 31 of turn-off pulses is connected to the base electrodes 27 and 29, and applies negative-polarity turn-off pulses alternately and repetitively to these electrodes at a frequency rate of about 1 kHz or greater and preferably about 20 kHz. A source 32 of a positive-polarity turn-on pulse is connected to one of the base electrodes 29. The turn-off pulse source 31 may be a multivibrator "flip-flop" circuit, or individual pulse sources properly synchronized, and the turn-on pulse source 32 may be a one-shot multivibrator.

Figure 2:
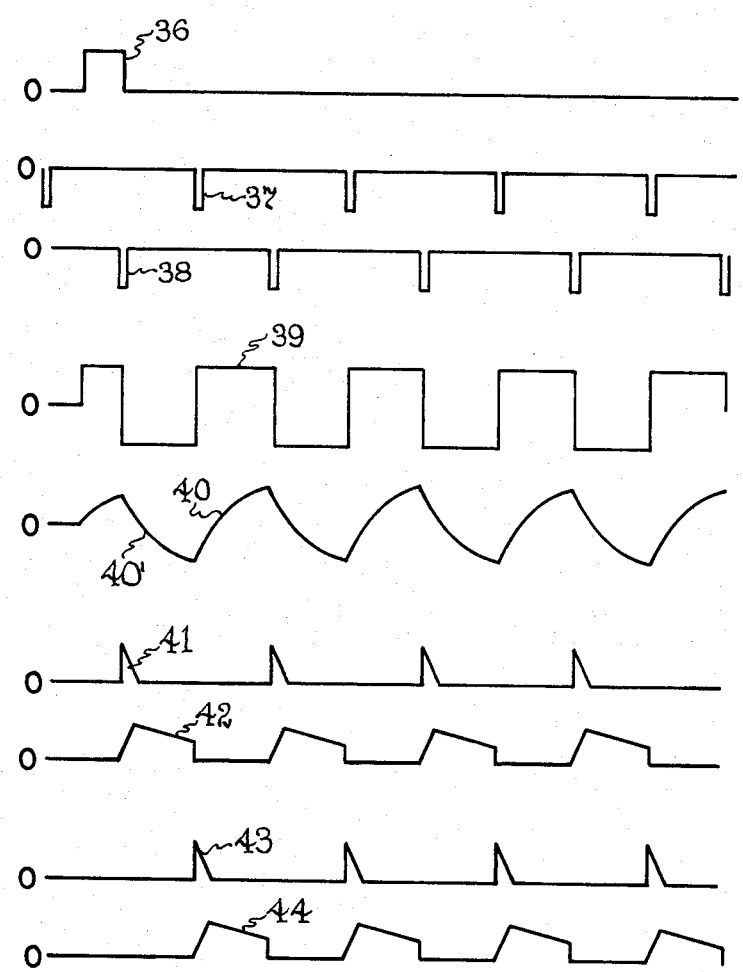
FIG. 2 is a time-plot showing of certain signals, voltage, and current in the circuit of FIG. 1 when operating.

In FIG. 2, certain signals, voltage, and current in the circuit of FIG. 1 are shown in vertically aligned time sequence, as follows. A single positive-polarity turn-on pulse 36 is provided by the source 32 and applied to the base 29 of transistor Q2 for initiating circuit operation. Repetitive negative-polarity turn-off pulses 37 and 38 are provided by the source 31 and applied respectively to the base electrodes 27 and 29 of transistors Q1 and Q2. These series of turn-off pulses 37, 38 are staggered 180 electrical degrees with respect to each other. Curves 39 and 40 respectively depict the voltage and current at the load 21, the voltage 39 having a square wave shape due to the alternate switching of transistors Q1 and Q2, and the current 40 having a typical wave shape for a load having an inductive component. Curves 41 and 42 respectively depict the inductive load fly-back current, and the resulting stored charge, at the base of transistor Q1. Similarly, curves 43 and 44 respectively depict the inductive load fly-back current, and the resulting stored charge, at the base of transistor Q2.

The circuit functions as follows. The turn-on pulse 36 renders transistor Q2 fully conductive, thus drawing current 40 through the load 21 via capacitor 22. Upon cessation of the turn-on pulse 36, and the occurrence of the next turn-off pulse 38 applied to the base 29 of transistor Q2, the transistor is rendered non-conductive and current ceases to flow in the load 21; however, stored energy in the inductive component of the load produces a "fly-back" voltage and current 41 of positive polarity which passes through the diode 26 to the base 27 of transistor Q1. This renders transistor Q1 fully conductive. During this inductive fly-back time, Q1 operates as an inverted transistor where the base-collector junction becomes the emitter and the base-emitter junction becomes the collector. This happens because capacitor 22 provides a return path from the collector 17 to the load 21, whereby the fly-back voltage pulse flows from the load 21 through diode 26, base 27, collector 17, and capacitor 22 back to the load 21. This is the inverse of the usual current flow from the base to emitter of a transistor, for turning the transistor on, hence the term "inverted transistor." During this fly-back time with Q1 operated in the inverted mode, current flows from emitter 13 to collector 17, which is opposite to the normal current flow from collector 17 to emitter 13. A charge 42 is stored in Q1 during this time. The quantity of charge and its spatial distribution within the transistor are significantly different than the charge stored by the transistor driven into saturation by an external base current where the transistor operates in its normal mode. When the inductive energy has dissipated, the stored charge keeps the transistor Q1 conductive, thus passing current 40' from terminal 11 through collector 17-emitter 13 and through the load 21 via the capacitor 23 to terminal 12, in the opposite direction to that of current flow when transistor Q2 conducts. The stored charge partly drains off, as shown by curve 42; however, the frequency of the turn-off pulses is chosen sufficiently high (20 kilohertz, for example) so that the next turn-off pulse 37 is applied to the base 27 while the stored charge is effective in maintaining conduction of the transistor. This turn-off pulse 37 drains off the remaining stored charge and renders transistor Q1 non-conductive, and terminates the load current whereupon stored energy in the inductive component of the load 21 produces a fly-back voltage and current 43 (of negative polarity at junction point 16) which is conductive through the collector-base junction of transistor Q2, and diode 28, and which is the equivalent of a positive-polarity pulse 43 applied to the base 29 (because collector 14 is negative), as shown in the drawing, which renders transistor Q2 again conductive, operating in an inverted mode, and creates a stored charge 44 in the transistor which maintains the transistor in a fully conductive state until the next turn-off pulse 38 occurs. The process is repetitive and causes an alternating current 40 to flow in the load 21.

By using the circuit's internal inductive fly-back pulses to turn on the transistors, and using the stored charges to maintain them on during their conductive cycles, no external source of repetitive square wave or sine wave control current is required for the transistors, and thus the circuit has improved efficiency and reduced energy requirements. The turn-off pulses 37 and 38 can be of very short duration, for example five microseconds and of low energy, so the overall energy of these pulses is very low compared to the energy required for the prior-art control currents. This energy can be further reduced by lowering the repetitive frequency of the turn-off pulses so as to allow relatively more of the stored charges 42 and 44 to drain off through internal impedance of the transistors.

The invention also achieves the important accomplishment of eliminating undesirable "shoot-through," described in the above-referenced patent, which occurs when the stored charge in one transistor keeps it conductive after the other transistor is turned on, whereby both transistors are conductive at the same time and cause a short-circuit across the power source. In the circuit of the invention, each transistor is turned on by a fly-back current which occurs only after the other transistor has been turned off, and thus it is impossible for both transistors to be conductive at the same time. Whereas stored charges in transistors have been undesirable in prior inverter circuits, they are made use of advantageously in the inverter of the present invention.

Another advantage of the invention is that if the load 21 becomes short-circuited, the circuit operation will stop since there will be no further inductive fly-back current to turn the transistors on. If the load short occurs when either Q1 or Q2 is on, the rise in load current will remove charge from the on transistor at a faster rate since charge is defined as current-time integral and the transistor remains in saturation. Once the charge is removed, the transistor turns off and operation ceases since there is no fly-back pulse to turn the other transistor on. In the above-referenced patent and other inverter circuits, the transistors are turned on by external repetitive voltages or currents, and if the load becomes short-circuited, the transistor currents become very high, thus overheating the transistors and perhaps destroying them.

In an alternative embodiment of the invention, the turn-off pulses 37 and 38 are not provided, and each of the transistors Q1 and Q2, when conductive, remains conductive until its stored charge drains off sufficiently so that the transistor automatically becomes non-conductive. Thus, the frequency of operation is determined by the stored charge drain-off time characteristics of the transistors. If accurate control of the operating frequency is desired, it is preferable to employ the repetitive turn-off pulses 37, 38.

While preferred embodiments of the invention have been shown and described, various other embodiments and modifications thereof will become apparent to persons skilled in the art, and will fall within the scope of the invention as defined in the following claims. For example, although the invention has been shown and described in a half-bridge inverter circuit, it can be used in other circuit configurations such as full-bridge and push-pull inverters.

What we claim as new and desire to secure by Letters Patent of the United States is:

1. An inverter circuit for operating from a d-c power source and applying alternating current through a load which is inductive or has an inductive component, comprising two transistors connected to alternately apply current through said load from said power source, said transistors having the characteristic of storing a charge in their base-collector regions, and said load having the characteristic of inducing a fly-back current when current flow therein is terminated, wherein the improvement comprises means connected between said load and the base electrodes of respective ones of said transistors for applying the fly-back current resulting from each turn-off of one of said transistors through the base-collector path of the other of said tranistors for causing said other of said transistors to operate as an inverted transistor and rendering said other transistor conductive and storing a charge therein to keep it conductive for a period of time, said circuit being devoid of an external source of repetitive turn-on pulses for said transistors.

2. A circuit as claimed in claim 1, including means for applying a turn-on pulse to one of said transistors for rendering it conductive and initiating operation of the circuit.

3. A circuit as claimed in claim 1, in which said means for applying fly-back current to the transistors comprises diodes.

4. A circuit as claimed in claim 1, including means for applying turn-off pulses alternately and repetitively to said base electrodes for rendering the transistors alternately non-conductive after they have been conductive for a given period of time.

5. A circuit as claimed in claim 4, in which the turn-off pulses applied to each transistor have a repetitive frequency greater than about one kilohertz.

6. A circuit as claimed in claim 5, in which said repetitive frequency is about twenty kilohertz.

7. An inverter circuit for operating from a d-c power source and applying alternating current through a load which is inductive or has an inductive component, comprising a pair of transistors, means connecting the emitter of the first transistor to the collector of the second transistor to form a junction point, means connecting the collector of said first transistor to the positive polarity of said power source and means connecting the emitter of said second transistor to the negative polarity of said power source, and means connecting said load between said junction point and said power source, said transistors having the characteristic of storing a charge in their base-collector regions, and said load having the characteristic of inducing a fly-back current when current flow therein is terminated, wherein the improvement comprises means connected between said load and the respective base electrodes for applying the fly-back current resulting from each turn-off of one of said transistors through the base-collector path of the other of said transistors for rendering said other transistor conductive and storing a charge therein to keep it conductive for a period of time, said circuit being devoid of an external source of repetitive turn-on pulses for said transistors.

8. A circuit as claimed in claim 7, including means for applying a turn-on pulse to one of said transistors for rendering it conductive and initiating operation of the circuit.

9. A circuit as claimed in claim 8, in which said turn-on pulse is a positive-polarity pulse applied to the base of said second transistor.

10. A circuit as claimed in claim 7, in which said means for applying fly-back current to said base electrodes comprises a pair of diodes respectively connected between said base electrodes and said load point.

11. A circuit as claimed in claim 7, including means for applying turn-off pulses alternately and repetitively to the base electrodes of said transistors for rendering the transistors alternately non-conductive after they have been conductive for a given period of time.

12. A circuit as claimed in claim 11, in which the turn-off pulses applied to each transistor have a repetitive frequency greater than about one kilohertz.

13. A circuit as claimed in claim 12, in which said repetitive frequency is about twenty kilonertz.

14. A circuit as claimed in claim 7, in which said load is connected to said power source by means of a pair of capacitors connected in series across the power source, an end of said load being connected to the junction of said capacitors.

* * * * *